United States Patent [19]

Krylova et al.

[11] 3,977,252
[45] Aug. 31, 1976

[54] METHOD AND APPARATUS FOR CONTROLLING LIQUID PRESSURE IN PIPELINES

[76] Inventors: Eleonora Dmitrievna Krylova, Beskudnikovsky bulvar, 32, korpus 2, kv. 32; Nikolai Ivanovich Brazhnikov, ulitsa 1 Bebelya, 3, korpus 11, kv. 48, both of Moscow, U.S.S.R.

[22] Filed: Nov. 21, 1975

[21] Appl. No.: 633,962

[30] Foreign Application Priority Data
Nov. 21, 1974 U.S.S.R............................. 2077127

[52] U.S. Cl................................ 73/398 R; 73/67.5 R
[51] Int. Cl.²................................................ G01L 9/00
[58] Field of Search......... 73/398 R, 32, 53, 67.5 R, 73/67.6, 194 A

[56] References Cited
UNITED STATES PATENTS

| | | | |
|---|---|---|---|
| 2,700,894 | 2/1955 | Valkenburg | 73/67.6 |
| 2,869,357 | 1/1959 | Kritz | 73/53 |
| 2,978,899 | 4/1961 | Kritz | 73/398 R |

Primary Examiner—Donald O. Woodiel
Attorney, Agent, or Firm—Lackenbach, Lilling & Siegel

[57] ABSTRACT

An apparatus and method for controlling liquid pressure in pipelines wherein the apparatus comprises an ultrasonic measuring converter including an ultrasonic emitter and an ultrasonic receiver mounted on the outer surface of the pipeline; a measuring unit incorporated in the apparatus having a driving pulse generator connected to the emitter and connected via a time delay unit to a reference pulse shaper; the output of the reference pulse shaper is connected to one input of an information pulse shaper which has its other input connected, via a signal pulse shaper and an amplifier to the ultrasonic receiver; the output of the information pulse shaper is connected to an input of an information pulse control unit and to an input of a control pulse shaper which has an output connected to the other input of the information pulse control unit; an output of the information pulse control unit is connected to an information pulse converter which is connected to a recording instrument. The method and apparatus for controlling liquid pressure in pipelines enable the measurement of liquid pressure in pipelines over wide ranges of pressure and temperature with a high accuracy.

11 Claims, 14 Drawing Figures

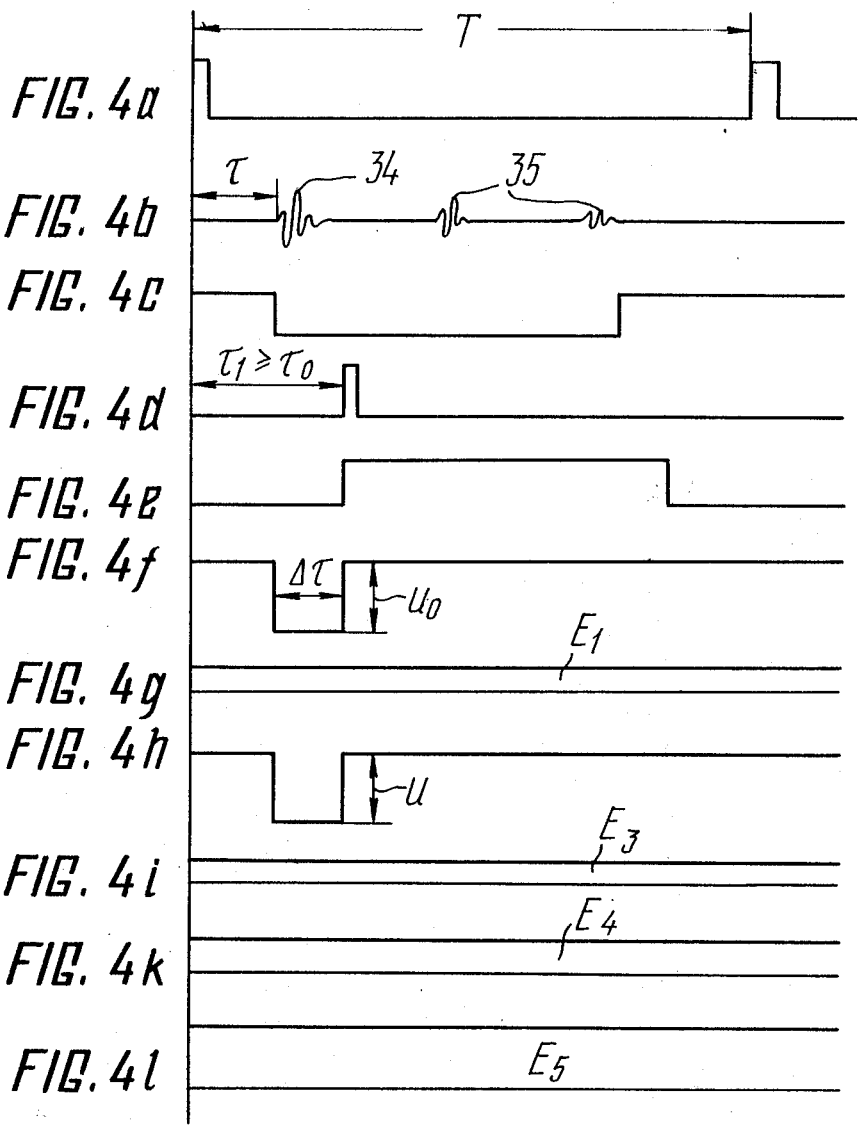

METHOD AND APPARATUS FOR CONTROLLING LIQUID PRESSURE IN PIPELINES

The present invention relates to an application of ultrasonic oscillations for automated remote control of parameters of liquid media in manufacturing control systems, and, in particular, to a method and apparatus for controlling liquid pressure in pipeline using ultrasonic oscillations.

The invention may be used in aviation, chemical, metallurgical, shipbuilding and other industries for automated contactless liquid pressure control in pipelines.

Known in the art are methods for measuring and controlling liquid pressure in pipelines. Among these methods, a method for measuring pressure from deformation of an elastic member has found wide application. This method consists in that an elastic sensor in the form of a membrane, bellows or tubular spring is mounted in the pipeline being controlled using auxiliary fittings, the deformation of the sensor being proportional to the liquid pressure being controlled.

This method is effected in visual and remote pressure control pressure gauges.

However, the employment of the above-described pressure control method requires the direct contact of the sensor and the liquid being controlled, hence the use of special fittings for installation of the sensor inside the pipeline prior to the pressure measurement is required.

In controlling a number of parameters indicative of the operability of hydraulic systems, additional information is to be obtained in certain applications on the liquid pressure at such portions of hydraulic systems where it is not possible to measure the pressure using stationary measuring equipment. In such case, a pipeline section would need to be disassembled for installation of additional pressure gauges, which results in an increased time for control on account of the disassembly and reassembly operations and the refilling of the system. In addition, this method results in liquid losses during the disassembly of the pipeline.

Recently, increasing attention is being paid to contactless pressure control methods in pipelines, which enable considerable simplification of the pressure control, improved productivity and reduction of liquid losses.

Contactless methods for measuring pressure may be divided into two main classes each being characterized by their manner of obtaining information concerning pressure:
1. in accordance with deformation of pipeline walls;
2. in accordance with modification of parameters of penetrating radiation.

The first class includes strain-gauge and piezoelectric pressure control methods.

With the above-mentioned pressure control methods, a strain gauge or a piezoelectric sensor is fixed stationary to the outer surface of the pipeline. Upon a change in the pressure of the liquid being controlled, the pipeline wall deformation results in varying the resistance of the strain gauge or of the electric potential of the piezoelectric sensor. These changes are recorded by an electric measuring circuit so that an electric signal proportional to the liquid pressure is obtained at the output of the measuring circuit.

It should be noted that in cases where the sensor is not in contact with the liquid being controlled, the sensor is still to be mounted stationary on the outer surface of the pipeline.

Thus, where the strain-gauge method is used, a portion of the pipeline is dismantled from the hydraulic system, and a strain gauge is cemented thereto, then the strain gauge is calibrated on a special bench, whereafter the pipeline is reassembled in the system, and the pressure is measured.

In addition, it is to be noted that the piezoelectric method only permits the measurement of the dynamic pressure component only, and also, that the characteristics of transducers of this type are unstable with time and are substantially temperature-dependent.

The ultrasonic measurement method belongs to contactless pressure control methods using penetrating radiation. This method is based on the dependence of the rate of propagation of ultrasonic oscillations in liquid on pressure.

Known in the art is a method for controlling liquid pressure based on the dependence of the rate of propagation of ultrasonic oscillations in liquid on pressure. This method comprises the steps of generating ultrasonic oscillations at regular intervals with driving pulses, transmitting the oscillations through the liquid being controlled, receiving them and converting them into signal pulses having a time delay with respect to the driving pulses, which depends on the rate of propagation of oscillations and, hence, on the pressure in the liquid. Concurrently, reference pulses are shaped from the driving pulses with a time delay. Then information pulses are shaped from the reference pulses and signal pulses, the length of the information pulses depending on the pressure in the liquid being controlled. The resultant information pulses are converted into a recording signal having a number of pulses proportional to the pressure in the liquid being controlled.

The above-described pressure control method enables the determination of pressure over a wide range in accordance with a change in the rate of propagation of ultrasonic oscillations due to changes in pressure.

However, the application of this method involves the measurement of pressure not directly of the liquid being controlled, but rather of an intermediate acoustically conductive medium, the pressure being transmitted thereto from the liquid being controlled.

In addition, the above-described method exhibits a non-linear dependence of the pressure being recorded on the time $\tau$ of propagation of ultrasonic oscillations in liquid so that an additional error is introduced in the pressure measurement. The reason for this is the fact that the time delay $\Delta\tau$ of ultrasonic oscillations with respect to the driving pulses depends; with sufficient degree of approximation; on changes $\Delta C$ in the rate $C$ of propagation of ultrasonic oscillations in the liquid being controlled with respect to the initial value $C_o$ thereof in the absence of pressure in accordance with the following formula:

$$\Delta\tau = \tau_o - \tau = \tau_o \frac{\Delta C}{C_o + \Delta C} \qquad (1)$$

wherein $\tau_o$ is time of propagation of ultrasonic oscillations in the liquid being controlled at the initial value $C_o$ of the rate of ultrasonic oscillations.

Known in the art is an apparatus for effecting the above-described method comprising an ultrasonic measuring converter including an ultrasonic emitter and an ultrasonic receiver, a driving pulse generator connected to the emitter and via a time delay unit to a reference pulse shaper having an output connected to one input of an information pulse shaper. The other input of the information pulse shaper is electrically coupled via an amplifier and a signal pulse shaper to the receiver. The output of the information pulse shaper is connected to an information pulse converter connected to a recording instrument.

In this apparatus, the pressure is measured not directly from the liquid being controlled, but from an intermediate acoustically conductive medium. For transmitting the pressure from the liquid being controlled in which the rate of propagation of ultrasonic oscillations to the intermediate medium is measured, the apparatus is provided with a hollow cylinder filled with an intermediate medium and communicating with the pipeline filled with the liquid being controlled. The cylinder accomodates special bellows into which the liquid being controlled is fed.

In addition, in order to reduce temperature-induced error in measuring pressure, the cylinder containing the intermediate medium is thermally conditioned in such a manner that the rate of propagation of ultrasonic oscillations in liquid is measured within the temperature range in which the temperature influence on the rate of propagation of ultrasonic oscillations is minimized. For that purpose, the apparatus has thermostabilizers comprising heating elements, cooling elements and temperature control units which make the apparatus very complicated.

Insofar as it is required to provide for transmission of pressure from the liquid being controlled to the intermediate medium, a special pressure transmission inlet should be provided in the pipeline being controlled so that contactless pressure control method cannot be applied.

It is an object of the invention to provide a method for controlling liquid pressure in pipelines of hydraulic systems using ultrasonic oscillations and an apparatus for effecting this method which ensures contactless measurement of liquid pressure in the pipeline.

Another object of the invention is to improve the accuracy of measurement of liquid pressure due to the reduction of non-linearity of readings of a recording instrument with pressure fluctuations over a wide range.

Still another object of the invention is to provide for measurement of liquid pressure over a wide range of temperatures of the liquid being controlled.

A further object of the invention is to simplify the operation of an apparatus for controlling liquid pressure in pipelines of hydraulic systems, reduce the control time and eliminate losses of working liquid.

The above objects are accomplished by a method for controlling liquid pressure a pipeline using ultrasonic oscillations, comprising the steps of generating ultrasonic oscillations at regular intervals with driving pulses, the ultrasonic oscillations being transmitted to the liquid being controlled, converting the received ultrasonic oscillations into signal pulses having a time delay with respect to the driving pulses depending on the rate of propagation of ultrasonic oscillations and, respectively, on the pressure of the liquid being controlled, concurrently shaping, from the driving pulses, reference pulses with a time delay; shaping from the reference pulses and the signal pulses information pulses with a pulse length depending on the pressure of the liquid being controlled; converting the resultant information pulses into a recording signal in which the amplitude or number of pulses is proportional to the pressure of the liquid being controlled, wherein, according to the invention, ultrasonic oscillations are transmitted to and received from the liquid being controlled through the pipeline walls shaping; a control signal with an amplitude proportional to the time of propagation of ultrasonic oscillations in the liquid, the control signal being used for controlling the amplitude of the information pulses.

The control signal is preferably shaped from the information pulses, the amplitude of the control signal being made proportional to the length of the information pulses.

The amplitude of the information pulses is preferably controlled by multiplying the amplitude of the information pulses by the amplitude of the control signal.

It is also advantageous that the amplitude of the information pulse be controlled by dividing the amplitude of the information pulses by the amplitude of the control signal.

The temperature of the liquid being controlled is preferably measured, and an additional signal is preferably shaped with an amplitude proportional to the measured temperature, the amplitudes of the additional signal and of the recording signal being added, and the presssure of the liquid being controlled determined from the value of the total amplitude.

The sign (polarity) of the additional signal is preferably made to coincide with the sign of the recording signal where liquids having a negative temperature coefficient of the rate of propagation of ultrasonic oscillations are controlled, the opposite sign being used with a positive value of the coefficient.

The above objects are accomplished also by an apparatus for effecting the method for controlling liquid pressure in pipelines using ultrasonic oscillations, comprising an ultrasonic measuring converter including an ultrasonic emitter and an ultrasonic receiver; a driving pulse generator connected to the emitter and via a time delay unit to a reference pulse shaper having an output connected to one input of an information pulse shaper which has the other input connected via a signal pulse shaper and an amplifier to the receiver; the output of the information pulse shaper is electrically coupled to an information pulse converter connected to a recording instrument, wherein, according to the invention, the ultrasonic emitter and the ultrasonic receiver are mounted on diametrically opposite portions of the outer surface of the pipeline; and, a control signal shaper and an information pulse amplitude control unit having one input directly connected to the output of the information pulse shaper and the other input connected via the control signal shaper to the information pulse shaper, the output of the control unit being connected to the information pulse converter.

The control signal shaper preferably comprises a series circuit connected to the information pulse shaper and including an integrator, a d-c. amplifier having an output connected to the control unit, and a reference signal setter connected to a second input of the amplifier.

The control unit may comprise a multiplier unit.

The control unit may also comprise a divider unit.

The apparatus is preferably provided with a thermocompensation unit, a thermosensitive member connected thereto and mounted on the outer surface of the pipeline directly adjacent to the ultrasonic measuring converter, and an adder having one input connected to the output of the thermocompensation unit, the other input connected to the information pulse shaper and an output connected to the recording instrument.

The above-described method for controlling liquid pressure in pipelines using ultrasonic oscillations and the apparatus for effecting the same have a number of advantages as compared to the prior art method and apparatus.

The method and apparatus according to the invention completely eliminate the need to disassemble the pipeline for measuring liquid pressure therein. This is achieved due to the fact that ultrasonic oscillations are transmitted to and received from the liquid being controlled directly through the pipeline walls by installing the ultrasonic emitter and receiver on the outer surface of the pipeline. Thus, pressure may be measured at any point along the pipelines of a hydraulic system. This permits a material reduction of the control time due to the elimination of the disassembly and re-assembly operations of the pipelines of hydraulic systems for installation of a measuring transducer, refilling of hydraulic systems, washing sealing and checking after re-assembly. In addition, losses of working liquid occurring during disassembly of pipelines of hydraulic systems are eliminated.

In addition, the above-described method and apparatus and provide for measuring liquid pressure over a wide range of pressure and temperature fluctuations with high accuracy of measurement. This is achieved due to reduced non-linearity of readings of a recording instrument with changes of the rate of propagation of ultrasonic oscillations in the liquid being controlled, which depends on the liquid pressure.

The reduction of the above-mentioned non-linearity is provided for by shaping from the information pulses control pulses having an amplitude proportional to the length of the information pulses and by using the control signals for controlling the amplitude of the information pulses. Thus, the pressure measuring range is materially enlarged.

Furthermore, the above-described method and apparatus provide for stable operation of the electronic circuit of the apparatus with the liquid temperature fluctuating over a wide range.

This is achieved due to the fact that, during the measurement of pressure, the temperature of the liquid being controlled is also measured, and an additional signal is shaped with an amplitude proportional to the measured temperature, the amplitudes of the additional signal and of the recording signal are added, and the total amplitude value is used to determine the pressure of the liquid being controlled.

Other objects and advantages of the invention will become apparent from the following detailed description of illustrative embodiments thereof with reference to the accompanying drawings, in which:

FIGS. 4a–4l show pulse diagrams illustrating operation of individual units of the apparatus according to the invention.

Figure 1:
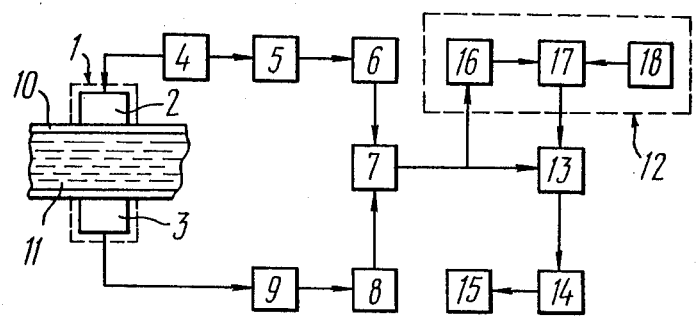
FIG. 1 shows a block diagram of the apparatus for controlling liquid pressure using ultrasonic oscillations according to the invention.

The apparatus for controlling liquid pressure in a pipeline comprises an ultrasonic measuring converter 1 (FIG. 1) including an ultrasonic emitter 2 and an ultrasonic receiver 3 for conventional design of piezoelectric type (as disclosed in U.S. Pat. No. 3,287,692). A driving pulse generator 4 is built with any known circuit for impact excitation of an electric oscillation circuit (as disclosed in U.S. Pat. No. 3,282,086). The generator 4 is connected to the emitter 2 and via a time delay unit 5 to a reference pulse shaper 6 having an output connected to one input of an information pulse shaper 7. The other input of the information pulse shaper 7 is connected, via a signal pulse shaper 8 and an amplifier 9 to the receiver 3.

The delay unit 5 is built with any conventional circuit. The signal pulse shaper 8 and the reference pulse shaper 6 comprise square pulse shapers built with any conventional multivibrator circuit, and the information pulse shaper 7 is built with any conventional time-dependent comparison circuit.

The emitter 2 and the receiver 3 are mounted on diametrically opposite portions of the outer surface of a pipeline 10 filled with a liquid 11 to be controlled.

The apparatus also comprises a control signal shaper 12 and an information pulse amplitude control unit 13. One input of the control unit 13 is directly connected to the output of the information pulse shaper 7, and the other input is connected to the same output via the control signal shaper 12. The output of the information pulse amplitude control unit 13 is connected to an information pulse converter 14, and a recording instrument 15 is connected to the output of the converter.

The control signal shaper 12 comprises a series circuit connected to the information pulse shaper 7 and includes an integrator 16, a d-c. amplifier 17 and a reference signal setter 18 which is connected to the amplifier 17.

The integrator 16 (FIG. 2) comprises a series circuit including a resistor 19 and a capacitor 20. The input of the integrator 16 is connected via an emitter follower circuit 21, to the output of the information pulse shaper 7.

The d-c. amplifier 17 comprises a transistor 22 having a base input resistor 23 connected in parallel with the capacitor 20 of the integrator 16. Feedback of the amplifier 17 comprises a resistor 24 inserted in the emitter circuit thereof. Initial bias at the base of the transistor 22 is provided by a resistor 25. A resistor 26 forms the collector load of the transistor 26. The transistor 22 is supplied by a d-c. voltage supply source $E_k$.

The reference signal setter 18 comprises the resistor 25 inserted between the voltage supply source $E_k$ and the base input of the transistor 22.

The information pulse amplitude control unit 13 comprises a multiplier unit consisting of a resistor attenuator including resistors 27, 28 and a diode 29. The resistor 27 is inserted between the collector output of the transistor 22 and the anode of the diode 29, the diode 29 being connected in series with the resistor 28. The cathode of the diode 29 is connected to the input of the integrator 16. The output of the control unit 13 is connected via a ground capacitor 30 to the information pulse converter 14. The converter 14 and the recording instrument 15 are of conventional type.

The control unit may comprise a divider unit 13 (not shown) built with any conventional operational amplifier circuits.

The above-described apparatus provides for measuring pressure of the liquid 11 in the pipeline 10 over a wide pressure range with a constant temperature of the liquid 11. Upon changes in the liquid temperature, errors in the pressure measurement appear, and to eliminate these errors, an alternative embodiment of the apparatus, shown in FIG. 3, should be used.

The apparatus according to this embodiment, in addition to the above-described emitter 2, receiver 3, generator 4, pulse shapers 6, 7, 8, control unit 13 and converter 14, is provided with a thermocompensation unit 31 and with a thermosensitive member 32 connected thereto. The thermosensitive member 32 is mounted on the outer surface of the pipeline 10 directly adjacent to the ultrasonic emitter 2. The apparatus also comprises an adder 33 having one input connected to the output of the thermocompensation unit 31 and the other input connected to the information pulse converter 14 and the output connected to the recording instrument 15.

The provision of the thermosensitive member 32, thermocompensation unit 31 and adder 33 enables substantial reduction of the measurement error which is due to changes in temperature of the liquid being controlled.

For illustration of operation of the above-described embodiments, FIGS. 4a, b, c, d, e, f, g, h, i, k, l show pulse diagrams for units 4; 9, 8, 5, 6, 7, 16, 13, 14, 32, 33, respectively, of the apparatus according to the invention.

FIG. 4 shows ultrasonic pulses 34 which have passed through the liquid 11 being controlled and pulses 35 repeatedly reflected from the inner surface of the pipeline 10.

The method for controlling pressure of the liquid 11 in the pipeline 10 using ultrasonic oscillations is effected in the above-described apparatus in the following manner.

The generator 4 generates electric driving pulses shown in FIG. 4a which are fed to the emitter 2 with a constant pulse repetition period T. The pulse repetition period is selected on the basis of the pressure measurement accuracy required which, in turn, depends on the diameter of the pipeline 10.

The emitter 2, which is driven by the electric pulses from the generator 4, transmits short ultrasonic pulses through the wall of the pipeline 10 into the liquid 11 being controlled.

After having passed through the liquid 11 being controlled and the opposite wall of the pipeline 10, the ultrasonic oscillations are received in the receiver 3, in the form of the attenuated amplitude pulses 34 shown in FIG. 4b, as sinusoidal damped oscillations to be converted therein into electric pulses with a carrier frequency equal to the ultrasonic oscillations frequency.

Ultrasonic oscillations repeatedly reflected from the inner surface of the pipeline 10 are also received in the receiver 3 in the form of pulses 35 to be converted into electric pulses.

The electric pulses 34 carrying information on the pressure being controlled are amplitude-amplified in the amplifier 9 and fed to the signal pulse shaper 8 which generates square pulses, as shown in FIG. 4c. The length of the square pulses is selected to be greater than the length of repeatedly reflected ultrasonic pulses within the pipeline 10 during one driving pulse repetition period T. This eliminates instability of operation of the electronic circuit of the apparatus which is due to the effect of repeatedly reflected ultrasonic oscillations on the operation of the signal pulse shaper 8 and it also improves the accuracy of pressure measurement which is especially important in controlling pressure in small-diameter pipelines (less than 10–15 mm diameter).

Concurrently with the driving pulses shown in FIG. 4a which are fed to the emitter 2, the pulses shown in FIG. 4d are fed from the generator 4 via the time delay unit 5 to the input of the reference pulse shaper 6. The delay time $\tau_1$ with respect to the driving pulses is selected to be at least equal to the time interval $\tau_0$ between the moment of excitation of ultrasonic oscillations and the moment of their reception after the passage through the liquid 11 being controlled at the minimal value $C_o$ of the rate of propagation of ultrasonic oscillations in liquid.

This selection of the delay time provides for direct proportionality between the recording signal and the pressure of the liquid 11 thus further facilitating the operation in measuring pressure.

The square wave reference pulses shown in FIG. 4e are fed from the output of the pulse shaper 6 to the second input of the information pulse shaper 7. Square information pulses of a constant amplitude are generated at the output of the pulse former 7, as shown in FIG. 4f, with the pulse length equal to the difference in the intervals of the signal pulse and the reference pulse which depends on the pressure in the liquid 11 being controlled.

The information pulses are fed from the output of the pulse shaper 7 via the emitter follower 21 to the input of the integrator 16 wherein they are converted at the capacitor 20 into a d-c. voltage proportional to the length of these pulses. This voltage is fed to the base of the transistor 22 in the amplifier 17.

The control signal is shaped from two components: the reference signal from the setter 18 and the output signal of the d-c amplifier 17. The reference signal is set-up in the following manner. At minimal length of the information pulses corresponding to minimal pressure, the collector current in the amplifier 17 is at its minimum, and the reference signal voltage $E_o$ at the collector thereof is different from the supply voltage $E_k$ by 1–2 volts.

In case the length of the information pulses is at its maximum, which corresponds to maximum pressure, the current grows, and the collector voltage is at its maximum. The value of minimal voltage is selected, by selecting either the resistor 19 in the integrator 16 or the resistor 26, to be 1–1.5 volts above the collector-emitter saturation voltage.

Output signal voltage of the amplifier 17 (shown in FIG. 4g), which is proportional to the length $\Delta\tau$ of the information pulses, is defined by the following formula:

$$E_1 = K_1 \frac{\Delta\tau}{\tau_o} \qquad (2)$$

wherein $K_1$ is a constant coefficient.

Output d-c. total voltage E at the collector of the transistor 22 is the following:

$$E = E_o - K_1 \frac{\Delta \tau}{\tau_o} \qquad (3)$$

The voltage E is attenuated in the control unit 13, in the resistor attenuator having a relative attenuation ratio of collector voltage of $\gamma$ and the resultant voltage $\gamma E$ is used as blocking bias voltage for the diode 29.

It should be noted that the amplitude U of the information pulse, shown in FIG. 4h, at the cathode of the diode 29 is defined as the difference in the amplitude $U_o$ of the information pulse fed to the anode of the diode 29 and the voltage $\gamma E$, and this amplitude may be expressed, taking into account the value of E from formula (3), in the following form:

$$U = U_o - \gamma E = U_o - \gamma E_o + \gamma K_1 \frac{\Delta \tau}{\tau_o} \qquad (4)$$

After transformation of Formula (4) into the form:

$$U = U_o \left(1 - \gamma \frac{E_o}{U_o} + \frac{\gamma K_1}{U_o} \frac{\Delta \tau}{\tau_o}\right)$$

and introducing $$K_2 = 1 - \gamma \frac{E_o}{U_o} \quad K_3 = \frac{\gamma K_1}{U_o K_2},$$

the expression of amplitude of the information pulses is obtained in the following form:

$$U = U_o K_2 \left(1 + K_3 \cdot \frac{\Delta \tau}{\tau_o}\right)$$

The expression $$K_2 \left(1 + K_3 \frac{\Delta \tau}{\tau_o}\right) = E_2$$

is the amplitude $E_2$ of the control signal directly affecting the information pulse amplitude in the control unit. Thus, expression (4) may be written as follows:

$$U = U_o E_2$$

Therefore, the control unit 13 controls the amplitude of the information pulses by multiplying this amplitude by the control signal amplitude.

The influence of non-linearity of readings of the recording instrument upon changes in pressure of the liquid being controlled is thereby materially reduced, whereby the control accuracy is improved.

The information pulses of the amplitude U are fed from the output of the control unit 13 to the converter 14. The amplitude $E_3$ of the recording signal at the output of the converter 14 is proportional to the product of the pulse length by the amplitude U and is inversely proportional to the information pulse repetition period T:

$$E_3 = U \frac{\Delta \tau}{T} = \frac{K_2 U_o}{T} \left(1 + K_3 \frac{\Delta \tau}{\tau_o}\right) \Delta \tau$$

and since from (1):

$$\frac{\Delta \tau}{\tau_o} = \frac{\Delta C}{C_o + \Delta C}$$

$$E_3 = \frac{K_2 U_o \tau_o}{T} \left(1 + K_3 \frac{\Delta C}{C_o + \Delta C}\right) \frac{\Delta C}{C_o + \Delta C} \qquad (5)$$

$$\text{or } E_3 = \frac{K_2 U_o \tau_o}{T C_o} (1 + \epsilon) \Delta C,$$

wherein $$\epsilon = \frac{\Delta C}{C_o + \Delta C} \left(\frac{K_3 C_o}{C_o + \Delta C} - 1\right). \qquad (6)$$

$\epsilon$ is relative error due to non-linear dependence of linear reading of the recording signal on the increment $\Delta C$ of the rate of propagation of ultrasonic oscillations, which is proportional to the pressure of the liquid 11 being controlled.

The recording signal $E_3$ is fed to the recording instrument 15 having the scale calibrated in units of increment $\Delta C$ of the rate of propagation of ultrasonic oscillations, or directly in units of the controlled pressure P, the following relationship being true for these values:

$$\Delta C = aP, \qquad (7)$$

wherein $a$ is a coefficient which is constant for a given liquid being controlled.

To minimize the error $\epsilon$, the coefficient $K_3$ is selected to be such that $\epsilon$ should be zero at maximum value of the quantity $\Delta C$ being recorded which is equal to $\Delta C_m$. Thus, according to (6), the coefficient $K_3$ should be:

$$K_3 = 1 + \frac{\Delta C_m}{C_o} \qquad (8)$$

With this selection of the coefficient $K_2$, the relative error value is defined as follows:

$$\epsilon = \frac{\Delta C_m - \Delta C}{(C_o + \Delta C)^2} \Delta C \qquad (9)$$

The value of $\epsilon$ is at its maximum at the value of $\Delta C$ equal to $$\Delta C_1 = \frac{\Delta C_m}{2 + \frac{\Delta C_m}{C_o}} \qquad (10)$$

Thus, the maximum of $\epsilon$ is $$E_m = \frac{\Delta C_m^2}{2 C_o (2 C_o + \Delta C_m)} \qquad (11)$$

and the maximum absolute error $\delta C_m = E_m \Delta C$, in measuring the increment $\Delta C$ of the rate of propagation of ultrasonic oscillations, is $$\delta C_m = \frac{\Delta C_m^3}{2 (2 C_o + \Delta C_m)^2} \qquad (12)$$

The value of the above-specified error, with average values in the measurement range of $\Delta C_m$ not exceeding, e.g. 0.2 $C_o$, is very small for practical purposes (about $10^{-3} C_o$).

In case of a broader range of change in the recorded value ΔC, the control unit is preferably made as a divider unit. In this case, the coefficient $K_1$ is selected to be equal to the amplitude $E_o$ of the reference signal from the setter 19, and the control signal has the amplitude:

$$E_2 = E_o - E_1 = K_1 (1 - \frac{\Delta\tau}{\tau_o}) \qquad (13)$$

under the effect of the control signal $E_2$ the amplitude of the information pulses is controlled in the unit 13 to become equal to $$U = \frac{U_o}{E_2} = \frac{U_o}{K_1(1 - \frac{\Delta\tau}{\tau_o})} \qquad (14)$$

The information pulses of the amplitude U are fed from the output of the control unit 13 to the converter 14. The amplitude E of the recording signal at the output of the converter is proportional to the product of the pulse length $\Delta\tau$ by the pulse amplitude U and inversely proportional to the driving pulse repetition period T:

$$E_3 = \frac{U \cdot \Delta\tau}{T} = \frac{U_o}{K_1 \cdot T} \cdot \frac{\Delta\tau}{1 - \frac{\Delta\tau}{\tau_o}}$$

Since $$\frac{\Delta\tau}{\tau_o} = \frac{\Delta C}{C_o + \Delta C} \text{ and } 1 - \frac{\Delta\tau}{\tau_o} = \frac{C_o}{C_o + \Delta C} \qquad (15)$$

$$E_3 = \frac{U_o \cdot \tau_o \cdot \Delta C}{K_1 \cdot T \cdot C_o}$$

The above expression shows that at any values of the change ΔC in the rate of propagation of ultrasonic oscillations, the recording signal is linear and directly and directly proportional to the recording quantity ΔC, hence to the pressure P of the liquid 11 being controlled. This materially improves the accuracy of pressure measurement and enlarges the measurement range.

The above-described method for controlling liquid pressure in pipelines and the apparatus for effecting this method provide for accurate pressure measurement at constant or almost constant temperature. However, the desired accuracy of measurement cannot be obtained with changes in the temperature of the liquid 11 being controlled because ΔC depends not only on the pressure, but also on changes Δt of liquid temperature from the initial value $t_o$ thereof:

$$\Delta C = a \cdot P - b_t \cdot \Delta t, \qquad (16)$$

wherein $b_t$ is temperature coefficient of the rate of propagation of ultrasonic oscillations in the liquid being controlled.

Figure 3:
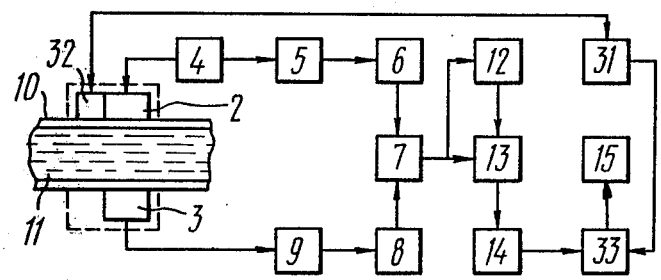
FIG. 3 shows a block diagram of another embodiment of the apparatus according to the invention.

The influence of the temperature error induced thereby can be attenuated by using the control method effected in the apparatus shown in FIG. 3.

By this method, concurrently with the pressure measurement, temperature of the liquid 11 being controlled is also measured by the thermosensitive member 32 mounted on the outer surface of the pipeline 10 directly adjacent to the emitter 2.

The signal from the member 32 is fed to the thermocompensation unit 31, and an additional signal is shaped at the output thereof, as shown in FIG. 4k, with an amplitude $E_t$ proportional to the temperature of the liquid 11 being controlled and equal to $$E_4 = \frac{U_o \cdot \tau_o}{K_2 \cdot T \cdot C_o} \cdot b_t \cdot \Delta t \qquad (17)$$

This signal is fed to the input of the adder 33, and the other input of the adder receives the signal from the converter 14, as shown in FIG. 4i.

The total signal, shown in FIG. 4l, has an amplitude $E_5$ whose value depends on the pressure P of the liquid being controlled and does not depend on the temperature:

$$E_5 = E_3 + E_4 = \frac{a \cdot U_o \cdot \tau_o}{K_2 \cdot T \cdot C_o} P = K \cdot P \qquad (18)$$

wherein K is a constant coefficient.

Figure 2:
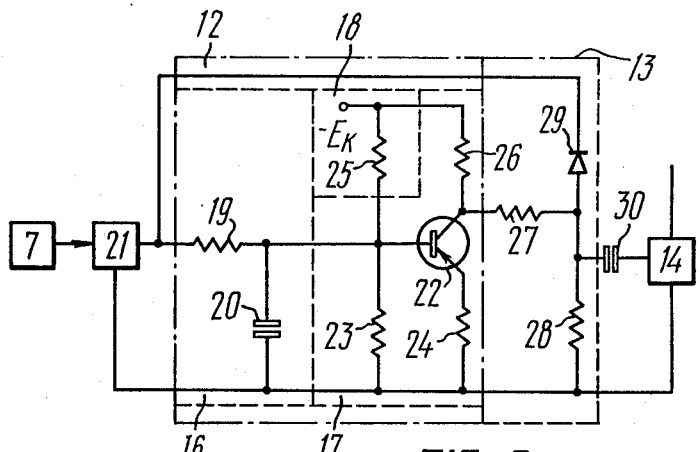
FIG. 2 shows a wiring diagram for the control pulse shaper and for the control unit according to the invention.

The above-described method for controlling the pressure of the liquid 11 in the pipeline 10 effected in the apparatus shown in FIGS. 1 and 2 provides for highly efficient contactless control of pressure of the liquid 11 in the manufacturing processes in various production facilities in aviation, metallurgical, chemical, shipbuilding and other industries.

What is claimed is:

1. A method for controlling liquid pressure in pipelines using ultrasonic oscillations comprising the steps of: exciting at regular intervals said ultrasonic oscillations with driving pulses; transmitting said ultrasonic oscillations to the liquid being controlled through the walls of said pipeline; receiving said ultrasonic oscillations passed through the liquid being controlled and the walls of said pipeline; converting said received ultrasonic oscillations into signal pulses, with a time delay of said signal pulses with respect to said driving pulses depending on the rate of propagation of said ultrasonic oscillations, and, hence, on the pressure in said liquid being controlled; concurrently shaping reference pulses with a time delay with respect to said driving pulses; shaping from said reference pulses and signal pulses, information pulses with a length dependent on the pressure in the liquid being controlled; shaping a control signal with an amplitude proportional to the time of propagation of said ultrasonic oscillations in said liquid being controlled; controlling the amplitude of said information pulses using said control signal; converting said controlled information pulses into a recording signal having an amplitude proportional to the pressure of said liquid in said pipeline.

2. A method according to claim 1, wherein said control signal is shaped from said information pulses in such a manner that the amplitude thereof is proportional to the length of said information pulses.

3. A method according to claim 1, wherein the amplitude of said information pulses is controlled by multiplying the amplitude of said information pulse by the amplitude of said control signal.

4. A method according to claim 1, wherein the amplitude of said information pulses is controlled by dividing the amplitude of said information pulse by the amplitude of said control signal.

5. A method according to claim 1, wherein the method further comprises measuring the temperature of said liquid being controlled; shaping an additional signal with an amplitude proportional to the measured temperature; adding the amplitudes of said additional signal and said recording signal, the pressure in said liquid being controlled being determined from the total amplitude.

6. A method according to claim 1, wherein the sign of said additional signal is made to coincide with the sign of the recording signal where liquids having negative value of temperature coefficient of the rate of propagation of ultrasonic oscillations are to be controlled, the sign being made opposite with positive values of the coefficient.

7. an apparatus for controlling liquid pressure in pipelines using ultrasonic oscillations comprising: an ultrasonic measuring converter; an ultrasonic emitter of said ultrasonic measuring converter mounted on the outer surface of said pipeline; an ultrasonic receiver of said ultrasonic measuring converter mounted on the outer surface of said pipeline; a driving pulse generator having two outputs of which one is connected to said emitter; a time delay unit connected to the other output of said driving pulse generator; a reference pulse shaper connected to the output of said time delay unit; an information pulse shaper having two inputs of which one is connected to the output of said reference pulse shaper; a signal pulse shaper having an output connected to said information pulse shaper; an amplifier having an input connected to said ultrasonic receiver and an output connected to the input of said information pulse shaper; a control unit for controlling the amplitude of information pulses having two inputs of which one is connected to the output of said information pulse shaper; a control signal shaper having an input connected to the output of said information pulse shaper and an output connected to the other input of said control unit; an information pulse converter connected to the output of said control unit; a recording instrument connected to said information pulse converter.

8. An apparatus according to claim 7, wherein the control signal shaper comprises an integrator connected to the output of said information pulse shaper; a d-c. amplifier connected to the output of said integrator; a reference signal setter of said control signal shaper; the d-c. amplifier of said control signal shaper having two inputs of which one is connected to the output of said integrator and the other is connected to said reference signal setter, and the output of said amplifier is connected to the input of said control unit.

9. An apparatus according to claim 8 comprising a multiplier used as said control unit; an adder unit used as said operational unit.

10. An apparatus according to claim 8 comprising a divider unit used as said control unit; a substractor unit used as said operational unit.

11. An apparatus according to claim 7, comprising a thermocompensation unit; a thermosensitive member mounted on the outer surface of said pipeline directly adjacent to said ultrasonic measuring converter and connected to said thermocompensation unit; an adder having two inputs of which one is connected to the output of said thermocompensation unit and the other - to said information pulse converter, and the output connected to the recording instrument.

* * * * *